US011142400B2

(12) United States Patent
Abou-Chakra

(10) Patent No.: US 11,142,400 B2
(45) Date of Patent: Oct. 12, 2021

(54) METHOD AND SYSTEM FOR TRANSPORTING UNITS WITHIN A STORAGE FACILITY

(71) Applicant: Dematic GmbH, Heusenstamm (DE)

(72) Inventor: Jad Abou-Chakra, St Ives (AU)

(73) Assignee: Dematic GmbH, Heusenstamm (DE)

( * ) Notice: Subject to any disclaimer, the term of this patent is extended or adjusted under 35 U.S.C. 154(b) by 0 days.

(21) Appl. No.: 16/500,832

(22) PCT Filed: Apr. 5, 2018

(86) PCT No.: PCT/EP2018/058751
§ 371 (c)(1),
(2) Date: Oct. 4, 2019

(87) PCT Pub. No.: WO2018/185231
PCT Pub. Date: Oct. 11, 2018

(65) Prior Publication Data
US 2020/0122925 A1 Apr. 23, 2020

(30) Foreign Application Priority Data
Apr. 7, 2017 (AU) ................................ 2017901286

(51) Int. Cl.
*B65G 1/06* (2006.01)
*B65G 1/04* (2006.01)

(52) U.S. Cl.
CPC ........... *B65G 1/065* (2013.01); *B65G 1/0485* (2013.01); *B65G 1/0492* (2013.01)

(58) Field of Classification Search
CPC ..... B65G 1/0485; B65G 1/0492; B65G 1/065
See application file for complete search history.

(56) References Cited

U.S. PATENT DOCUMENTS 3,620,389 A    11/1971   Munck
3,924,300 A * 12/1975   Hilger ................. B65G 1/0485
                                                         414/281

(Continued)

FOREIGN PATENT DOCUMENTS

AU   2013301752 B2   1/2017
CN   201046851 Y   4/2008

(Continued)

OTHER PUBLICATIONS

International Search Report of the International Searching Authority from corresponding Patent Cooperation Treaty (PCT) Application No. PCT/EP2018/058751, dated Jun. 21, 2018.

(Continued)

*Primary Examiner* — James Keenan
(74) *Attorney, Agent, or Firm* — Gardner, Linn, Burkhart & Ondersma LLP

(57) ABSTRACT

An automated warehouse storage system for storage and retrieval of items and conveying items within the storage system comprises a plurality of primary multilevel storage racks, the primary multilevel storage racks positioned parallel with one another, and extending in a first direction. The plurality of primary multilevel storage racks have at least one storage rack exchange level, in which items are delivered to or retrieved from the storage racks, and at least one exchange position in the at least one storage rack exchange level. At least one transfer shuttle is configured to travel in a second direction spanning the exchange positions of the storage racks and transverse to the first direction, with the transfer shuttle and the exchange positions configured for exchanging items between the transfer shuttle and the exchange positions of the storage racks to retrieve or deliver items.

17 Claims, 13 Drawing Sheets

(56) References Cited

U.S. PATENT DOCUMENTS

| | | | |
|---|---|---|---|
| 6,036,427 A | 3/2000 | Kita et al. | |
| 6,321,138 B1* | 11/2001 | Livesay | B65G 1/0414 |
| | | | 198/346.1 |
| 6,652,213 B1* | 11/2003 | Mitchell | B65G 1/0492 |
| | | | 414/279 |
| 7,584,017 B2* | 9/2009 | Sugano | B65G 1/0485 |
| | | | 198/370.03 |
| 9,630,777 B2* | 4/2017 | Yamashita | B65G 1/0492 |
| 10,822,168 B2* | 11/2020 | Sullivan | B65G 1/0492 |
| 2012/0141236 A1* | 6/2012 | Korner | B65G 1/0485 |
| | | | 414/222.01 |
| 2014/0205423 A1 | 7/2014 | Yamashita | |
| 2017/0129704 A1* | 5/2017 | Okazaki | B65G 1/06 |

FOREIGN PATENT DOCUMENTS

| | | |
|---|---|---|
| DE | 2107824 A1 | 8/1972 |
| DE | 102009032406 A1 | 1/2011 |
| DE | 202014100476 U1 | 3/2014 |
| EP | 1254852 A1 | 11/2002 |
| EP | 2287093 A1 | 2/2011 |
| EP | 2351698 A1 | 8/2011 |
| EP | 2526032 A1 | 11/2012 |
| EP | 2949604 A1 | 12/2015 |
| EP | 2949605 A1 | 12/2015 |
| JP | 2012153482 A | 8/2012 |
| JP | 2013052960 A | 3/2013 |
| JP | 2015151270 A | 8/2015 |
| JP | 2016016964 A | 2/2016 |
| WO | 2016139003 A1 | 9/2016 |

OTHER PUBLICATIONS

Written Opinion of the International Searching Authority from corresponding Patent Cooperation Treaty (PCT) Application No. PCT/EP2018/058751, dated Jun. 21, 2018.

* cited by examiner

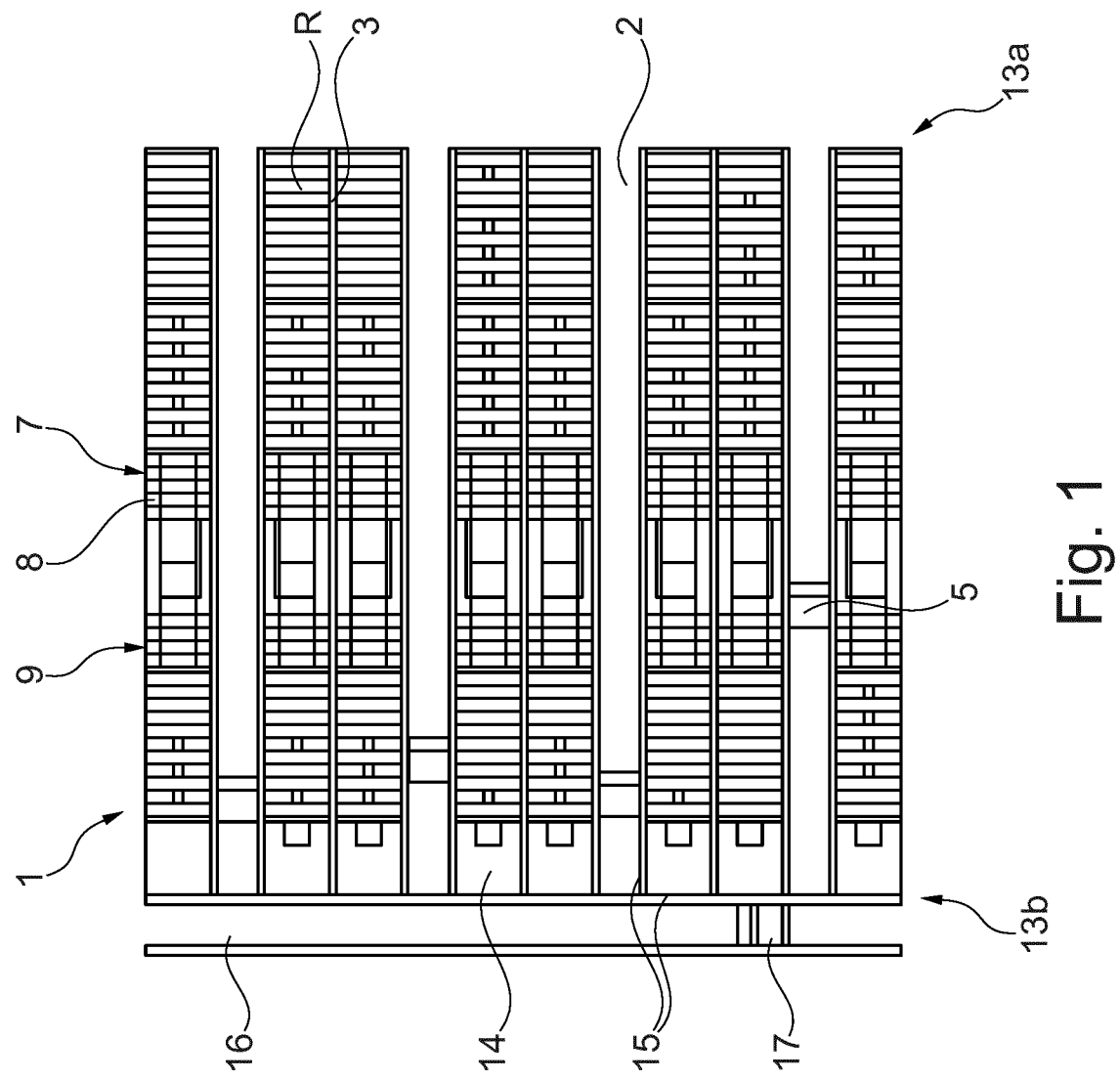

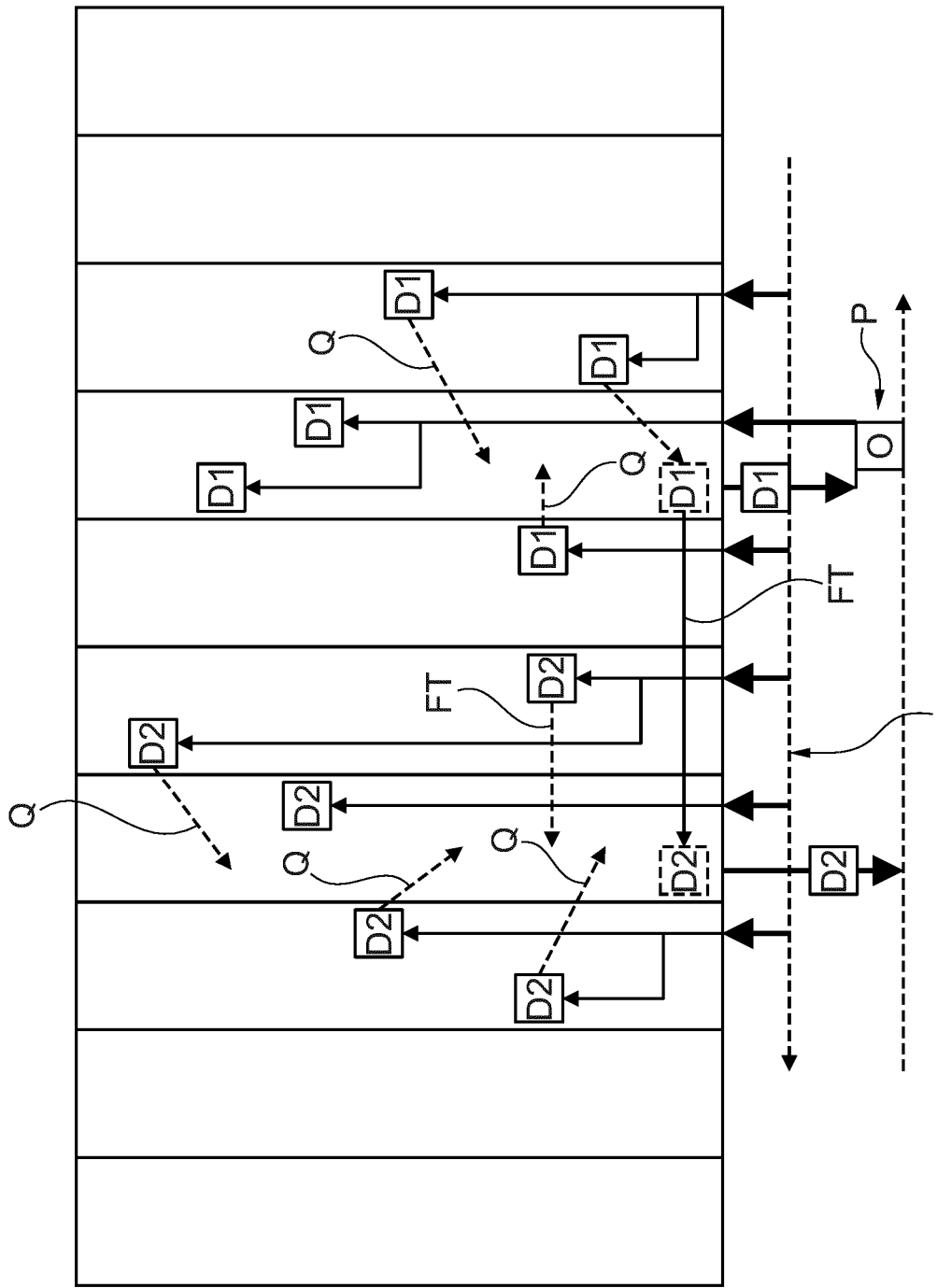

METHOD AND SYSTEM FOR TRANSPORTING UNITS WITHIN A STORAGE FACILITY

CROSS REFERENCE TO RELATED APPLICATION

The present application claims the priority benefits of International Patent Application No. PCT/EP2018/058751, filed Apr. 5, 2018, and claims benefit of Australian patent application AU 2017901286, filed on Apr. 7, 2017.

TECHNICAL FIELD OF THE INVENTION

The disclosure relates generally to a system for efficiently storing and moving stored items, including storage units or totes, within a warehouse or other storage facility. The method and system has particular application to efficient inter rack movement for items, totes or units stored in multiple story facilities or on multilevel storage racks. However, it is to be appreciated that the method and system have broader application and is not limited to that particular use.

BACKGROUND

It is known from AU 2013301752 to utilize racks and shuttles to route items, totes or units within a storage facility. Therein the items are exchanged between adjoining racks by transverse conveyance locations through which the shuttles themselves actively exchange items between the racks by pushing or pulling the items from one adjoin rack to the other. This allows for disposal of the so-called front or pre-zone in which an exchange of items normally takes place. However, as the number of aisles increases, the amount of time required for transferring items, totes or units by shuttle between racks and conveying them from the facility increases. Moreover, if a rack is congested or down for maintenance it becomes difficult or impossible to transfer items, totes or units past that rack or aisle.

DE 10 2009 032 406 A1 discloses a storage facility in which the storage racking has single level shuttles servicing the aisles that change levels by use of a lift on one end of the racking aisle or by use of a storage and retrieval cart at the other end of the aisle, which runs along a track that is orientated by a right angle to the direction of the aisles.

EP 2 287 093 A1 discloses a storage facility in which the storage racking has single level shuttles running on first tracks for servicing the aisles, wherein the storage facility has second tracks oriented in a transverse direction to the first tracks, wherein the shuttles may change from the first tracks to the second tracks.

SUMMARY OF THE DISCLOSURE

Disclosed is an automated warehouse storage system for storage and retrieval of items and conveying items within the storage, the system comprising a plurality of primary multilevel storage racks, the primary multilevel storage racks positioned parallel with one another, facing each other with an aisle in between and extending in a first direction; wherein the plurality of primary multilevel storage racks has at least one storage rack exchange level, in which items are delivered or retrieved to the storage racks, and at least two storage rack aisles have at least one exchange position in the at least one storage rack exchange level; and wherein at least one transfer shuttle configured to travel in a second direction spanning the exchange positions of the storage racks and transverse to the first direction, the transfer shuttle and the exchange position configured for exchanging items between the transfer shuttle and the exchange positions of the storage racks to retrieve or deliver items.

In other words, the racks share an exchange zone with a transfer shuttle, whose travel route spans racks having exchange positions. The exchange zone is accessible by the transfer shuttle and the storage and retrieval device of the racks, so that these may exchange items via the exchange zone. This allows the user to do away with or at least reduce the prezone.

The exchange positions therefore can be used to buffer and decouple the functions of the transfer shuttle and storage and retrieval device of the racks.

Disclosed is also an automated warehouse storage system for storage and retrieval of items and conveying items within the storage, the system comprising a plurality of primary multilevel storage racks, the primary multilevel storage racks positioned parallel with one another, facing each other with an aisle in between and extending in a first direction; the primary multilevel storage racks of neighboring aisles adjoining one another, an automated storage and removal apparatus (ASRS) for each aisle for storage and retrieval of items, which exchanges items directly between adjacent storage racks in a certain level by actively displacing items between a storage rack of a first aisle and a storage rack of an adjacent aisle using passive transverse conveyance locations, wherein each aisle has at least one exchange position on a storage rack exchange level, at least one transfer shuttle located on a storage rack exchange level, configured to travel in a second direction spanning the exchange positions of the storage racks, transverse to the first direction, and configured for exchanging items with the exchange positions of the racks to retrieve or deliver items from the exchange positions.

In other words, a system is disclosed for storing items and conveying items within a storage facility, the system comprising a plurality of storage racks in multiple storage rack levels, each storage rack level having a plurality of primary racks, the primary racks positioned parallel with one another and extending in a first direction; a plurality of exchange ends allowing access onto or off the primary rack in more than one direction, the exchange ends each positioned at a first end of one of the primary racks, the exchange ends being substantially in line with one another in a second direction, and a plurality of shuttles, each shuttle located on a separate storage rack level, each shuttle spanning the plurality of primary racks and configured to travel in the second direction, adjacent the exchange ends of the racks to retrieve or deliver items, totes or units from the exchange ends and provide inter-rack transfer.

In some forms the shuttle is in the form of an independent transport vehicle. In some forms the shuttle is in the form of a track guided transport vehicle or mobile platform.

In some forms the shuttle is in the form of a wire guided transport vehicle or mobile platform. The shuttle may be in the form of any mobile support or container for conveying items.

Such a system allows for providing alternative routes for item exchange between racks or storage positions. This may also speedup exchange between racks located farther away from each other than if only direct rack exchange were used as in AU 2013301752.

The exchange level with the exchange positions and transfer shuttle will usually be located on a central level (in vertical direction) of the warehouse for a storage rack but can also be present on several levels per storage rack or even most preferred on each level of a storage rack.

It is preferred that the plurality of multilevel storage racks has at least two storage rack exchange levels with at least one transfer shuttle per exchange level.

Vice versa, there will usually be at least one transfer shuttle per exchange level. However, depending on track length, number of exchange positions and racks, desired throughput etc. more than one transfer shuttle may be used in an exchange level. Such could be put into effect using any number of fast track aisles (or tracks). So there could be e.g. three transfer shuttle each on their own track (independent of its location and orientation) or three transfer shuttles sharing a longer single track.

In accordance with the disclosure, it has been recognised that if, between two adjoining storage racks, a direct exchange of transport units takes place from one storage racking aisle to an adjacent storage racking aisle via transverse conveyance locations in the storage racks, it is possible to dispense with the distribution and/or complex sorting in the pre-zone, since the transport units are already sorted when removed from storage, even if initially they were not arranged in a common racking aisle, as they are stored in the meantime in the removal-from-storage aisle, even if initially they were stored somewhere else. Therefore, by dispensing with the distribution and sorting outside of the aisles it is possible to achieve a direct transfer of the transport units without conveyors crossing one another, and this can be achieved with reduced and simplified technical outlay as well as with a smaller space requirement and a high level of reliability. The transport units can thus be simply removed from storage from the respective aisle in the required sequence. In accordance with the disclosure, the storage-entry and removal-from-storage apparatus serves to move the transport units in the transverse conveyance locations (Q), i.e., there is no further drive technology in the rack, but the storage-entry and removal-from-storage apparatus itself is the only active mechanism involved in the transverse displacement. In particular, the storage-entry and removal-from-storage apparatus places the transport units from the source aisle directly into the transverse conveyance locations of the target aisle (by means of multiple-depth storage entry), which means that the storage-entry and removal-from-storage apparatus of the adjacent target aisle simply has access thereto. In particular, this relates to a fully automated storage facility.

In other words, racking storage locations of abutting racks are used for passing transport units from one side of the rack to the next, so that the transport units can be transferred from one rack to the next as in the case of a hatch.

Therefore, transverse conveyance or sorting are possible within the racks themselves and "transverse conveyance" in the pre-zone can be dispensed with accordingly.

In an expedient manner, the transverse conveyance locations are provided on each level of the storage racks or on selected levels.

Particularly effective displacement-time optimisation is achieved if the transverse conveyance locations are arranged centrally or more closely to the removal-from-storage lift or the storage-entry lift in the longitudinal direction of the rack. It is likewise possible to provide a plurality of transverse conveyance locations on the respective level and optionally at different positions.

The transverse conveyance locations can also be used as temporary storage or most ideally buffering areas, i.e. the transport units remain therein until they are actually required or removed from storage. This is particularly expedient if the transverse conveyance locations are associated with the final target aisle of the transport unit.

The exchange can be effected actively or passively with regard to the storage-entry or removal-from-storage apparatus, i.e. on the one hand, the transverse conveyance location can simply be a passive storing location, in which the storage-entry and removal-from-storage apparatus of one aisle stores transport units (quasi places them into storage) and from which the racking serving unit of the adjacent aisle receives transport units (quasi removes them from storage). This procedure can be performed for each racking storage location or transverse conveyance location always only in one direction or in both directions.

On the other hand, it is likewise possible to equip the transverse conveyance location with corresponding materials handling technology, such as driven rollers, loose roller conveyor optionally inclined, conveyor belts with or without a drive etc. Then, the storage-entry and removal-from-storage apparatus can store the transport units and the materials handling technology of the transverse conveyance location performs the transportation. Accordingly, the transverse conveyance locations can be configured as conventional storage locations, live storage racks inclined or not inclined, with or without an active or passive drive, as roller conveyors, belt conveyors etc. The transverse conveyance locations can also comprise a pushing mechanism for the transport units.

The simplicity of the transverse conveyance locations also permits subsequent retrofitting and conversion of transverse conveyance locations and flexible adaptation to the required capacity of the storage system.

The transverse conveyance locations can thus optionally be configured for bidirectional or unidirectional exchange and/or for active or passive exchange. The storage-entry and removal-from-storage apparatuses can likewise place the transport units into storage at single depth to multiple depths in the transverse conveyance locations for exchange purposes. The storage-entry and removal-from-storage apparatuses of one aisle can thus place into storage the transport units in the transverse conveyance locations at such a depth that they are already to be assigned to the adjacent rack and can be reached "normally" by the corresponding storage-entry and removal-from-storage apparatus.

For this purpose, the load picking-up means of the storage-entry and removal-from-storage apparatuses, e.g. telescopic rail arms, can have an extended reach.

The storage-entry and removal-from-storage apparatuses may include an elevating function to serve multiple rack levels.

It is likewise feasible for the transport units to be stored and/or transported in a stacked manner, both also being possible when using the transfer shuttle.

Since the transverse conveyance locations and the exchange positions may be subject to very considerable loads, it is expedient if the transverse conveyance locations and/or and the exchange positions have a friction-reducing surface and/or structural reinforcement is undertaken. Therefore, damage to the transport units is also reduced or even completely prevented.

It is particularly preferred if the storage-entry and removal-from-storage apparatuses are racking serving units or single-level racking serving units. Shuttles or satellite vehicles are particularly suitable. It is also possible to use those shuttles which have a lifting platform or a plurality of load picking-up means platforms, which are arranged one above the other, for serving a plurality of levels from one travel rail.

It is preferred that the automated storage and removal apparatus is a shuttle located in the aisle, so-called aisle shuttle.

The transfer shuttle and the aisle shuttle can both be so-called MultiShuttle® devices, which are used in particular as the single level rack serving unit or shuttle. They are described for example in EP 1 254 852 A1. Such shuttle are rail-bound vehicles which operate in the aisle and serves the rack. They are rail-guided vehicles having an article carrying area with a telescopic load handling means, e.g. as described in EP 2 351 698 A1. The shuttles may also have a flexible length (view in longitudinal direction of the traveling direction) and as such variable article carrying area, as described in EP 2 526 032 A1.

The shuttles can be used in two variants, a so-called "captive" or "roaming" arrangement. In the captive arrangement, the shuttles remain on their respective level, meaning they service only one aisle in a single level. In the roaming arrangement, they change levels according to requirement, meaning they can change levels and possibly even aisles.

As the orientation of the first direction and the second direction are transverse to each other, the orientation of the items with respect to the carrying shuttle changes with the transfer from one shuttle to the other. Therefore, it is preferred that the transfer shuttle is adapted to carry an item orientated transversely compared to the item on the aisle shuttle. This can be achieved for example by using the variable article carrying area (see above) or a different fixed length.

In accordance with an aspect of the disclosure, each or selected aisle may have more than one exchange position. One each may be arranged in line with the respective rack. Further, one may for example be used for adding buffering purpose for item entry into an aisle and the other one used for item exit from an aisle.

Particularly effective displacement-time optimisation is achieved if the exchange positions are arranged closely to the removal-from-storage lift or the storage-entry lift in the longitudinal direction of the rack.

The exchange positions can also be used as temporary storage or most ideally buffering areas, i.e. the transport units remain therein until they are actually required or removed from storage. This is particularly expedient if the exchange positions are associated with the final target aisle of the transport unit.

In some forms an exchange position is formed by an exchange platform being accessible by the transfer shuttle and also being accessible by the automated storage and removal apparatus of each aisle.

Such an exchange platform could be formed in the sense of a flat surface, like a shelve or storage position within the rack.

In other words, it functions as an area which is mutually accessible by the transfer shuttle and the ASRS (or aisle shuttle) so that they can alternatively place or retrieve items onto or from the exchange platform, as if it were a normal storage shelf.

It should allow single deep or multiple deep placement of items in both the first direction and the second direction.

In an alternative version of the disclosure, an exchange position may be mechanized, by e.g. a conveyor means allowing positioning of an item for take-up by the transfer shuttle and vice versa for the automated storage and removal apparatus or aisle shuttle.

In other words, it is likewise possible to equip the exchange positions with corresponding materials handling technology, such as driven rollers, loose roller conveyor optionally inclined, conveyor belts with or without a drive etc. Then, the storage-entry and removal-from-storage apparatus can drop-off the transport units and the materials handling technology of the exchange position performs the transportation. Accordingly, the exchange positions can be configured as conventional storage locations, live storage racks inclined or not inclined, with or without an active or passive drive, as roller conveyors, belt conveyors etc. The exchange positions can also comprise a pushing mechanism for the transport units.

It is preferred that the exchange positions are located at one end of the storage racks or aisles.

In an embodiment using fast track exchange and possibly also transverse conveyance locations, the system may comprise a secondary rack oriented to extend in the second direction, adjacent to the track of the transfer shuttle.

In a different embodiment, the system may comprise a second plurality of primary multilevel storage racks, the exchange positions of the first plurality of primary multilevel storage racks and the second plurality of primary multilevel storage racks facing each other.

It is useful, if the system includes at least an item lift for exchange of items between storage rack levels and the storage rack exchange level, especially if the aisle shuttles are captive. Then it is most preferred that a lift is arranged in each rack.

One lift of an aisle may be configured as removal lift and the other as an entry lift. Of course, it is also possible to use one lift for both removal and entry.

In any lift configuration, it is possible to decouple the lift from the aisle serving machine, i.e. ASRS or shuttle, by using a buffer location (e.g. roller conveyor) that accepts items from the lift or transfers items to the lift.

It is also advantageous if each lift has, for each transportation location, a separately driven conveyor. In particular, it is then meaningful if each lift has two transportation locations which are each provided with a separately driven conveyor, which conveyors are displaceable in different directions. Therefore, the transfer of two transport units for each level can be effected simultaneously in different directions or onto buffers, e.g. to the left and right. To this end, the reception of the transported items onto the lift is preferably controlled in such a manner that the two items are to be delivered to one level.

Within the system there may also be made use of goods-to-person picking stations (GTP) for order fulfillment.

The system permits the use of four strategies for order processing and full case handling, and consolidation strategies of full source units in the automated storage facility using the fast track exchange and/or inter rack exchange by transverse conveyance based upon the number of aisles, picking stations, lifts, number of exchange tracks or routes and positions, order utilisation and distribution and order and storage details (profiles) etc. when used in a GTP application:

only relevant source units are transferred to a specific aisle by means of the transverse conveyance locations and/or transfer shuttles, wherein the aisle is selected based upon minimisation of the movement in the transverse conveyance locations between aisles and/or minimisation of the movement using the exchange positions and transfer shuttle and order utilisation and distribution. In other words, for picking purposes the aisle selected is the one which permits minimisation of the movement of the product units for order processing or consolidation of full source units and orders or partial orders can be completed at a single picking station.

only order units are transferred in the storage facility by means of the transverse conveyance locations and/or using the exchange positions and transfer shuttle. In other words, picking is performed at each relevant aisle, in which a relevant product unit is stored and the order units "travel" via a plurality of aisles to a plurality of picking stations until the order is fulfilled.

order units as well as product units are transferred in the automated storage facility by means of the transverse conveyance locations and/or using the exchange positions and transfer shuttle. In other words, picking is performed at a small number of selected aisles, at which relevant product units for an order are consolidated by means of the transverse conveyance locations and/or transfer shuttles such that the order units "travel" in the same manner via a plurality of aisles to selected picking stations until the order is fulfilled. Consolidation of the order units and product units is based upon optimisation of the order utilisation and distribution and optimum use of such mobile resources, such as e.g. racking serving units, lifts etc.

incoming source units or full source units are placed into storage in the automated storage facility directly into the particular aisle or nearest possible aisle which will be used or most likely be used for order processing, based upon the information available at the time of storage-entry, taking into account a minimisation of the transverse displacement in the transverse conveyance locations and/or using the exchange positions and transfer shuttle. This information includes but is not limited to:

instantaneous product distribution or deviations of each product in the storage facility;

orders which are already associated with individual aisles;

orders awaiting processing;

summary of families or product categories

The GTP stations may be arranged in a separate picking level and can be sourced by direct connection using the lifts (as described above) to transport items to the GTP stations. It is possible that each aisle or selected aisles are connected to a GTP station or alternatively more than one GTP station, preferably using both lifts of the respective racks, one for discharge and one for supply.

Also disclosed is a method of storing, retrieving and conveying items within a storage facility, the method comprising providing a plurality of primary storage racks positioned parallel with one another and extending in a first direction, being serviced by a storage and retrieval device, providing a plurality of aligned exchange positions located at one end of each of the primary racks in an exchange level, the receiving items from the storage and retrieval device and exchange positions configured for allowing take-up of items by the storage and retrieval device, providing a transfer shuttle spanning the plurality of racks and configured to run substantially in a second direction transverse to the first direction in the exchange level, exchanging items between the shuttle and the exchange positions to transport one or more items between the racks.

In other words, a method is disclosed for storing items, totes or units and conveying items, totes or units within a storage facility, the method comprising providing a plurality of primary racks positioned parallel with one another and extending in a first direction, providing a plurality of aligned exchange ends allowing access onto or off the primary racks, providing an autonomous shuttle spanning the plurality of racks and configured to run substantially transverse the first direction and adjacent the exchange ends, utilizing the shuttle to transport the item between the racks.

The details and features discussed in connection with the inventive systems also can be applied or used in the proposed method.

As such it is especially preferred that a plurality of aisle shuttles is configured to run in the first direction as storage and retrieval devices and use a lift to transport items to and from the exchange level.

According to the preferred embodiment, a method of storing, retrieving and conveying items comprises transferring an item from a rack onto the aisle shuttle, conveying the item in the first direction to a position proximal the exchange position using the aisle shuttle, transferring the item onto the exchange position in the second direction, transferring the item from the exchange end in the first direction and onto the transfer shuttle and conveying the item in the second direction using the transfer shuttle.

Accordingly, the method may also include conveying the item in the second direction to a position proximal the exchange position using the transfer shuttle, transferring the item onto the exchange position in the first direction, transferring the item from the exchange end in the second direction and onto an aisle shuttle, conveying the item in the first direction using the aisle shuttle and transferring an item to a rack from the aisle shuttle.

A system as described above is beneficial in use in a storage facility as it can increase efficiency of movement of items, totes or units between racks. Further in some forms it can allow more than one route across a series of racks, allowing for avoidance of congested areas or areas with an obstruction. The same applies to the method described above.

In the disclosure, the words items, totes or units are used to broadly define a stored item, a storage unit or a tote used in a storage facility. It will be understood that further descriptive terms may be utilized for the objects being stored or conveyed. In the disclosure, the word rack has been used to refer to storage racks used in the storage facility. It is to be understood that other terms may be used for the racks, shelves or stands referred to.

It is convenient to hereinafter describe embodiments of the system and method with reference to the accompanying drawings. The particularity of the drawings and the related description is to be understood as not superseding the generality of the preceding broad description of the method and system.

BRIEF DESCRIPTION OF THE DRAWINGS

FIG. 1 shows a plan view of one embodiment of a system of the disclosure;

FIG. 12 shows a simplified and schematic view of the inventive storage facility which is operated in accordance with a fourth principle.

DETAILED DESCRIPTION OF THE PREFERRED EMBODIMENTS

Figure 1A:
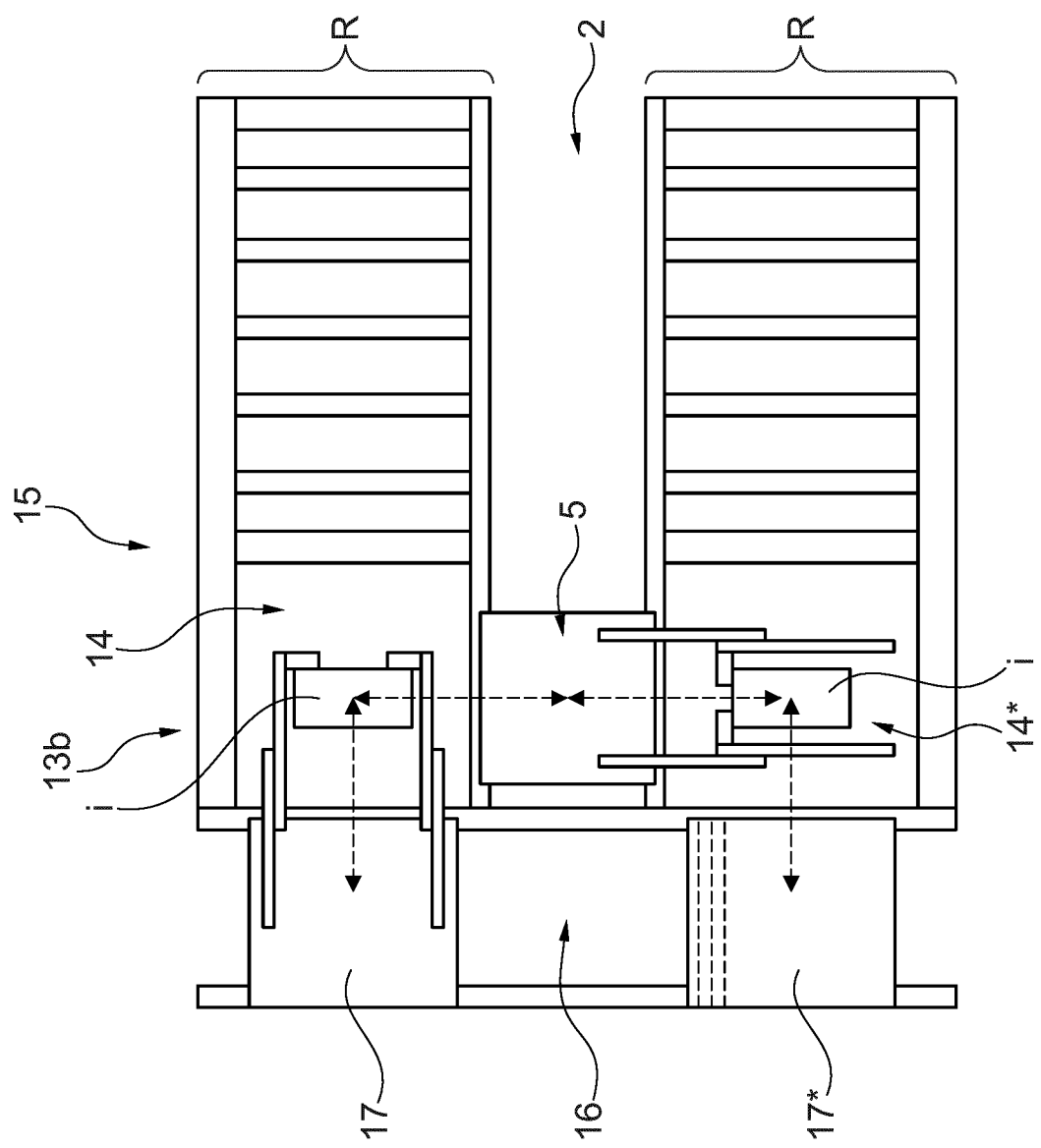
FIG. 1A shows an enlarged exchange position of FIG. 1.

According to a first aspect there is provided a system for storing items, totes or units and conveying items, totes or units within a storage facility, the system comprising a plurality of storage racks in multiple storage rack levels, each storage rack level having a plurality of primary racks, the primary racks positioned parallel with one another and extending in a first direction; a plurality of exchange ends allowing access onto or off the primary rack in more than one direction, the exchange ends each positioned at a first end of one of the primary racks, the exchange ends being substantially in line with one another in a second direction, a plurality of autonomous shuttles, each shuttle located on a separate storage rack level, each shuttle spanning the plurality of primary racks and configured to travel in the second direction, adjacent the exchange ends of the racks to retrieve or deliver items, totes or units from the exchange ends and provide inter-rack transfer.

In some forms, at least a portion of the primary racks are arranged in pairs adjoining one another.

In some forms direct transfer of items, totes or units takes place between adjoining pairs of racks.

In some forms, access aisles extend longitudinally between the pairs.

In some forms direct exchange of items, totes or units takes place across the aisles through use of a shuttle located in the aisle.

In some forms the exchange ends comprise exchange zones allowing passage of an item, tote or unit between the more than one access zone to allow movement of an item, tote or unit between shuttles. In some forms the exchange ends allows exchange of an item tote or unit through 90 degrees.

In some forms the system further comprises a secondary rack oriented to run parallel to the movement of the autonomous shuttle.

In some forms the secondary rack acts as a primary rack. In some forms the secondary rack is turned through 90 degrees.

In some forms the system allows movement of items, totes or units between storage racks over a plurality of routes.

Further, disclosed is a method of storing items, totes or units and conveying items, totes or units within a storage facility, the method comprising providing a plurality of primary racks positioned parallel with one another and extending in a first direction, providing a plurality of aligned exchange ends located at one end of each of the primary racks, the exchange ends allowing access onto or off the primary racks, providing an autonomous shuttle spanning the plurality of racks and configured to run substantially transverse the first direction and adjacent the aligned exchange ends, utilising the shuttle to transport one or more items, totes or units between the racks.

In some forms, the method further comprises utilising a plurality of aisle shuttles configured to run in the first direction.

In some forms, the method comprises transferring an item from a rack onto the aisle shuttle, conveying the item in the first direction to a position proximal the exchange end, transferring the item onto the exchange end in the second direction; transferring the item from the exchange end in the first direction and onto the autonomous shuttle; conveying the item in the second direction.

In some forms, the method further comprises utilising a further secondary rack turned through 90 degrees to extend transverse to the primary racks.

In previous systems, moving items, totes or units between racks or aisles in a multi-story system required movement of the item from one rack to another, limiting the movement to a single route or at least a route that crossed multiple racks.

The figures illustrate a storage facility which is designated in its entirety by the reference numeral 1 and has a plurality of storage racking aisles 2 and storage racks R having a plurality of levels 3.

In this form the storage racks R are arranged in such a manner that the storage racks R not arranged on the outside are each arranged in pairs adjoining one another and have a racking storage aisle 2 on one side. The storage racks R located on the inside in each case thus abut one another with their "backs".

On one end side, a lift 8 having two locations in each case is provided for each storage racking aisle 2. In some forms at the lower most level, the lift 8 is adjoined by either a storage-entry feeding line 4 and a removal-from-storage feeding line 6 (see FIG. 8). Arranged between the lift 8 and the storage rack R on each level 3 are corresponding storage-entry and removal-from-storage buffer lines 7 and 9 in order to decouple the lift 8 from the satellite vehicles 5 (also referred to as aisle shuttles) travelling in the storage racking aisle 2.

It is understood that the storage-entry feeding lines 4 and removal-from-storage feeding lines 6 are connected to suitable conveying lines for picking locations etc.

The shuttles 5 are provided in each racking storage aisle 2 and on each level 3 at that location. This is a so-called "captive" variant, in which the shuttles 5 are fixedly allocated to one level 3 and do not change levels or aisles which would theoretically be possible.

Figure 2:
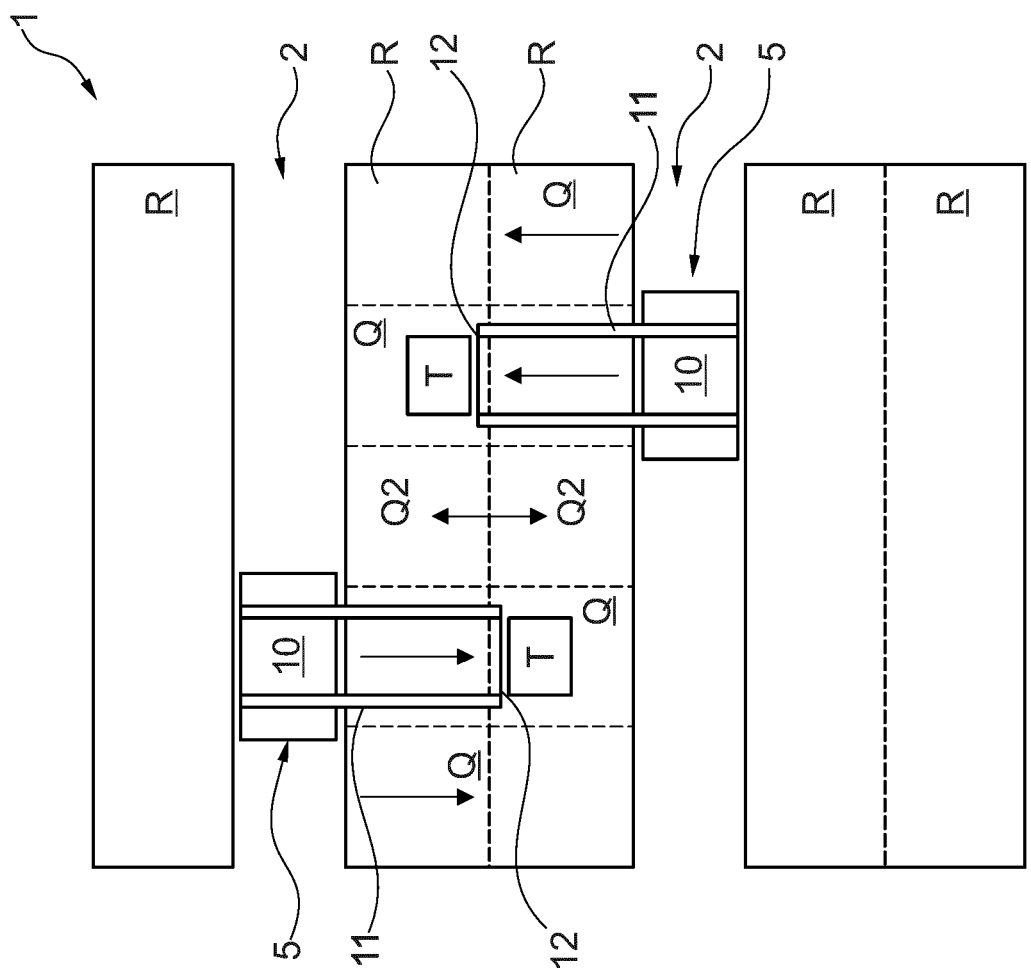
FIG. 2 shows a direct exchange between racks in FIG. 1.
Figure 3:
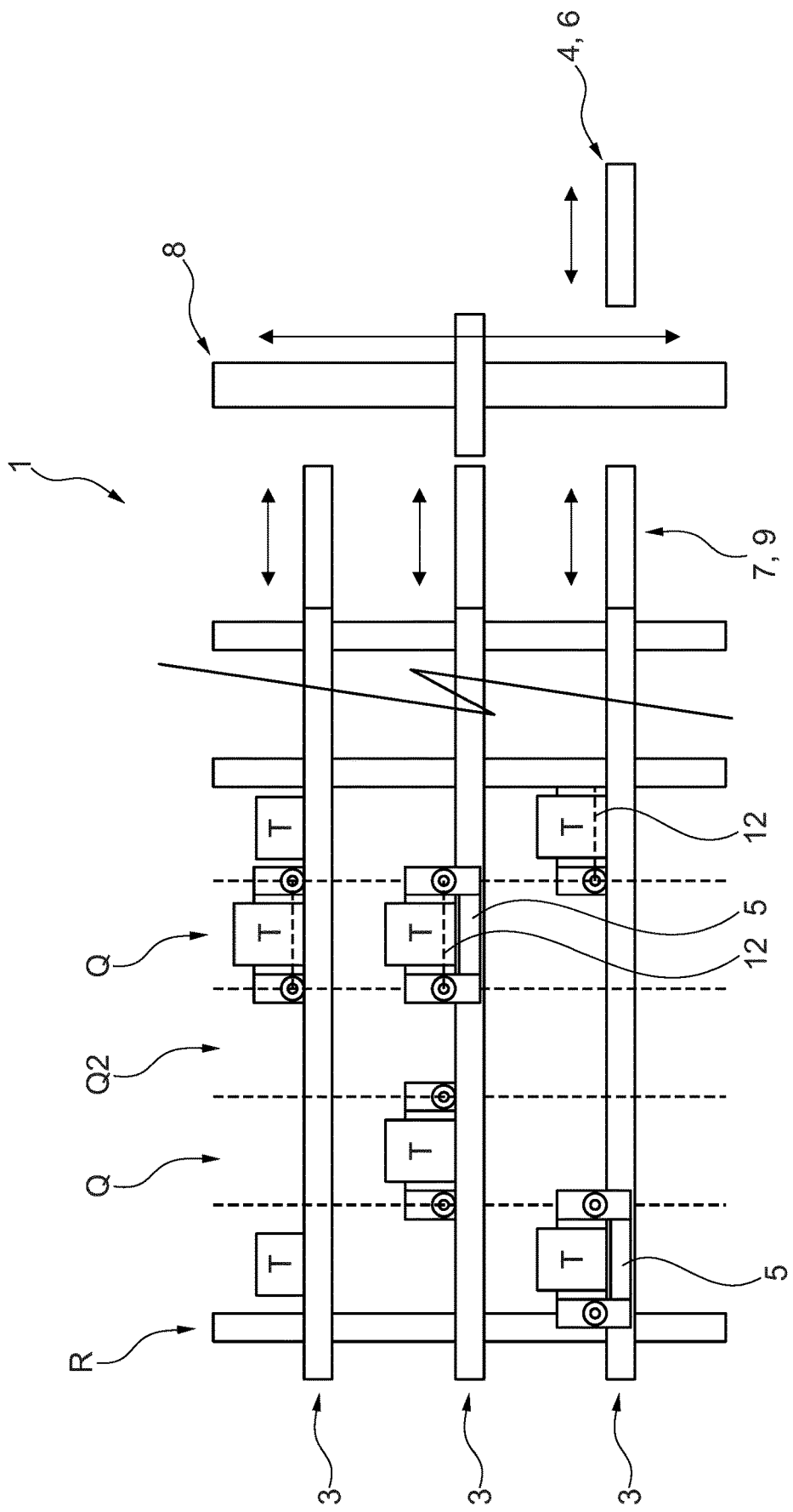
FIG. 3 shows a lateral view of FIG. 2.

Turning to FIGS. 2 and 3, the shuttles 5 comprise a transport platform 10 for receiving the respective transport unit T (carton, tray, container, goods, items without loading aids, etc.). Arranged at the side of the transport platform 10 are in each case telescopic arms 11 which push the transport unit T off the platform 10 or pull it up onto the platform.

For this purpose, the telescopic arms 11 can be extended on both sides of the storage racking aisle 2 into the racks R and have carriers 12 which can move in a known manner.

The storage racks R are provided on each level 3 with specific exchange locations Q for transversely conveying transport units T from one rack R to the adjacent rack R, so that the transport units T are exchanged within the storage racks R themselves and corresponding outlay in the pre-zone can be avoided.

The shuttles 5 or the telescopic arms 11 thereof can therefore place transport units T in the transverse conveyance locations Q and push them into the corresponding location in the adjacent rack R.

To this end, the respective transport unit T is acted upon by means of the carriers 12 of the telescopic arms 11 beyond the rear storing location 13 of one transverse conveyance location Q of the first rack R into the respective rear storing location 13 of the adjacent transverse conveyance location Q of the adjacent rack R.

Furthermore, the storage racks R comprise a transverse conveyance location Q2. In contrast to the transverse conveyance locations Q, the transverse conveyance location Q2 is bidirectional which means that an exchange can take place from the two racks R to the respectively adjacent rack R and the direction is determined by the transport unit placed down first.

A plurality of "normal" transverse conveyance locations Q are provided in each case (in this case two for each rack R) so that they do not have to be emptied immediately but rather—depending upon the configuration of the order to be removed from storage—can be used as a temporary storage area, from which the order is directly removed from storage. Therefore, the shuttles of adjacent racking aisles can be decoupled.

For the purposes of removal from storage, the transport units T are removed by the shuttles 5 from the storage rack R and are delivered to the removal-from-storage buffer 9 which conveys the transport units T onwards to the lift 8 and thus to the removal-from-storage feeding line 6. Conversely, storage-entry is effected via the storage-entry feeding lines 4, the lift 8 and the storage-entry buffer 7 and the shuttle 5 into the respective storage rack R.

It is understood that storage entry and removal from storage can also be disentangled and can take place at different points on the storage rack R, e.g. at different end sides or even integrated laterally in the storage rack R.

Turning back to FIG. 1 and FIG. 1A, disclosed is a storage facility 2 of a warehouse 1. In this illustrated form, the primary racks R extend in a first direction from a first end 13a to an exchange end 13b. The exchange end 13b may be in the form of a shared zone and allows access onto and off an exchange platform 14 in the first direction as well as allowing access onto and off the exchange platform 14 in a second direction that is transverse to the first direction. The exchange ends 13b include a plurality of access zones 15 that are located on adjacent sides of the exchange platforms 14.

In this illustrated form the exchange ends 13b or platforms 14 of each primary rack R are aligned with one another in the second direction, substantially transverse to the first direction and to the length of the primary racks. The alignment of the exchange ends 13b allows for a fast-track aisle 16 extending along one end of the primary racks R.

In some forms the system 1 further includes an fast-track transfer shuttle 17 that is configured to run along the fast-track aisle 16 in the second direction, that is transverse to the length of the plurality of primary racks R.

In some forms, the fast-track transfer shuttle 17 is positioned such that it runs adjacent to the plurality of exchange ends and platforms.

In some forms the autonomous fast-track shuttle 17 allows for inter aisle transfer by acquiring an item or unit from the exchange platform 14 of one primary rack R and delivering it to the exchange platform 14 of another rack.

The fast-track transfer shuttle 17 direction of movement extends along the aisle 16 and "shares" locations with every primary rack.

Each or selected aisle has more than one exchange positions 14. One each is arranged in line with the respective rack R. The exchange positions 14 are formed by an exchange platform with a flat surface, being accessible by the transfer shuttle 17 and also being accessible by the aisle shuttle 5 of each aisle.

In other words, it functions as an area (exchange zone) which is mutually accessible by the transfer shuttle 17 and the aisle shuttle 5 so that they can alternatively place or retrieve items onto or from the exchange platform 14, as if it were a normal storage shelf.

It allows single deep or multiple deep placement of items in both the first direction and the second direction.

This exchange process is demonstrated in FIG. 1A, in which hashed/dotted lines indicate movement of the transfer shuttle 17 and items i.

In a first position adjacent the exchange platform 14 the transfer shuttle 17 may pull an item i from the respective exchange platform onto its carrying area, as indicated. In a second position the transfer shuttle, now referenced with as 17* may push an item i from its carrying area onto the respective exchange platform 14*, as indicated.

The aisle shuttle 5 may either pull an item i from the respective exchange platform onto its carrying area or push an item i from its carrying area onto the respective exchange platform 14*, as indicated.

As the orientation of the first direction and the second direction are transverse to each other, the orientation of the items on the shuttles 5, 17 change with the transfer from one shuttle to the other. Therefore, the transfer shuttle 17 is adapted to carry an item orientated transversely compared to the item on the aisle shuttle 5.

The system in some forms has the benefit of decreasing the number of halts or obstructions to movement between primary racks, increasing the possible alternative routes for movement between racks, and increasing the speed of movement between racks.

Figure 4:
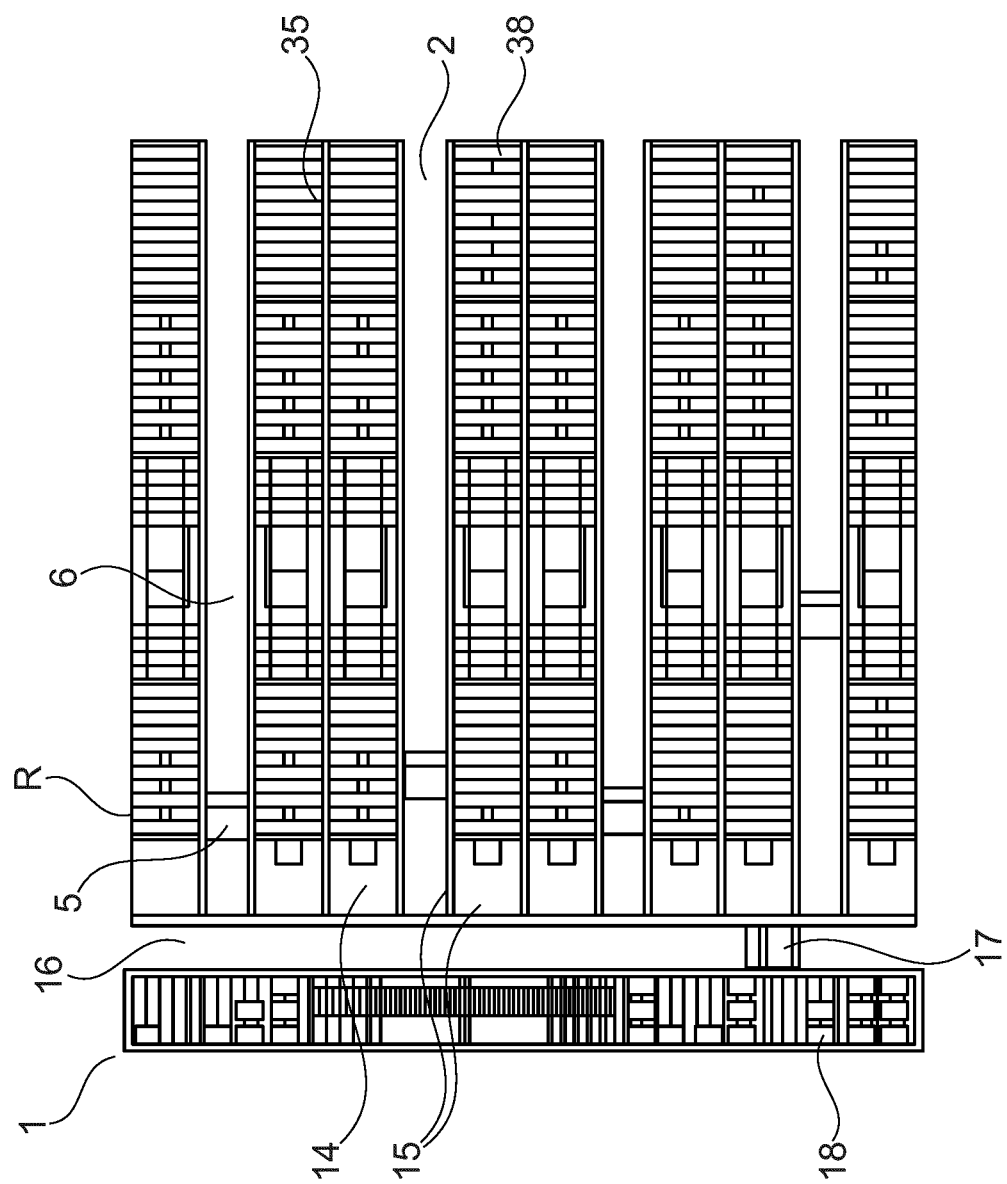
FIG. 4 shows a plan view of a second embodiment of a system of the disclosure.

Turning to FIG. 4, disclosed is an alternative embodiment of the system.

In this embodiment disclosed is a storage facility which comprises a plurality of primary racks R which generally extend parallel to one another. In the illustrated forms at least a portion of the primary racks R are arranged in pairs adjoining one another. When in pairs, one side edge 35 of the racks R abuts the side edge 35 of the adjoining rack R. The pairs of racks R are separated by aisles 2 which allow for access to the racks R.

In this illustrated form, the primary racks R extend in a first direction from a first end 38 to an exchange end or exchange platform 14. The exchange end 14 may be in the form of a shared zone and allows access onto and off the exchange end 14 in the first direction as well as allowing access onto and off the exchange end 14 in a second direction that is transverse to the first direction. The exchange ends 14 include a plurality of access zones 15 that are located on adjacent sides of the exchange ends 14. Passage between the access zones 15 allows for exchange of the item, tote or unit from one shuttle to another, with movement occurring in two directions and turns the item tote or unit as desired.

The exchange ends 14 of each primary rack R are aligned with one another in the second direction, substantially transverse to the first direction and to the length of the primary racks. The alignment of the exchange ends 14 allows for a fast-track aisle 16 extending along one end of the primary racks R.

The system 1 further includes an autonomous fast-track shuttle 17 that is configured to run along the fast-track aisle 16 in the second direction, that is transverse to the length of the plurality of primary racks. The autonomous fast-track shuttle 17 is positioned such that it runs adjacent to the plurality of exchange ends. The autonomous fast-track shuttle 17 allows for inter aisle transfer by acquiring an item or unit from the exchange end 14 of one primary rack R and delivering it to the exchange end 14 of another rack.

The system 1 further includes a plurality of autonomous aisle shuttles 5 which are configured to run in aisles 6 located between the primary racks R. The aisle shuttles 5 are configured in use to acquire an item from a position in the rack and convey it in the first direction to another position in the rack R or to the exchange end 14 for exchange to the fast-track shuttle.

A secondary rack 18 or fast track lane is turned through an angle from the primary racks. In this form the secondary rack 18 is turned through 90 degrees from the first direction, that is the secondary rack extends transverse to the direction in which the primary racks extend. The fast-track shuttle 17 has a route which extends in line with the secondary rack 18. In some forms this route is arranged along a track.

The secondary rack 18 still functions as a rack in storing and conveying items, totes or units.

In contrast to the primary racks R the secondary rack 18 in some forms has triple deep storage of items which is due to change of their orientation when exchanged between shuttles 5 and 17 using the exchange platforms 14.

The use of a fast-track transfer shuttle 17 such as that shown in the embodiments can change or decrease the shuttle workload for the aisle shuttles performing transverse location transfers and can also speedup transfer between racks and aisles having a larger distance. In some forms, it also allows faster movement of a smaller distance between the secondary rack and the primary racks.

Figure 5:
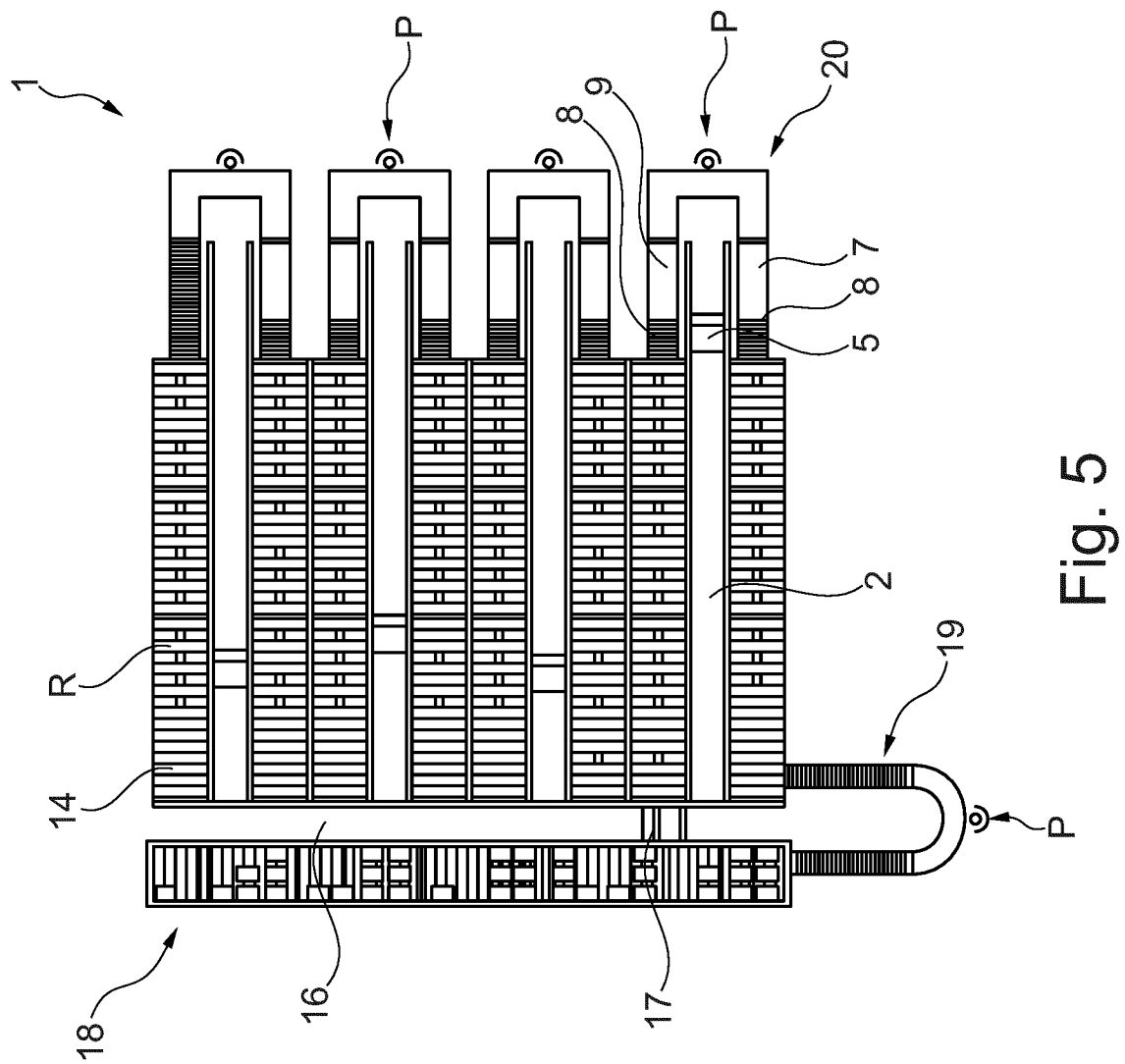
FIG. 5 shows a plan view of a third embodiment of a system of the disclosure.

Turning now to FIG. 5, disclosed is a further system 1 comprising a plurality of primary racks R. A portion of the primary racks R are arranged in pairs adjoining one another. When in pairs, one side edge 5 of the racks R abuts the side edge of the adjoining rack R. The pairs of racks R are separated by aisles 2 which allow for access to the racks R.

The primary racks R include an exchange end 14 located at one end of the primary rack. The exchange end 14 is aligned with the exchange ends 14 of other primary racks R and allows for transfer of items, totes or units onto or off the exchange ends 14 in more than one direction. Transfer can occur in the first direction which is aligned with the length of the primary racks R or in a second direction transverse to the primary racks. Transfer from the exchange ends 14 happens from adjacent sides of the exchange ends 14.

In this illustrated form an autonomous fast track shuttle 17 is configured to run adjacent to the plurality of exchange ends 14 to allow inter aisle transfer of items, totes or units onto the fast-track shuttle 17 from the exchange ends 14. Further a plurality of autonomous aisle shuttles 5 are configured to run along the primary racks in line with the racks R.

In this form a secondary rack 18 extends perpendicular to the primary racks R and aligned with the fast-track shuttle 17.

A plurality of lifts 8 are shown in this form for transport between levels or stories of racks.

Figure 6:
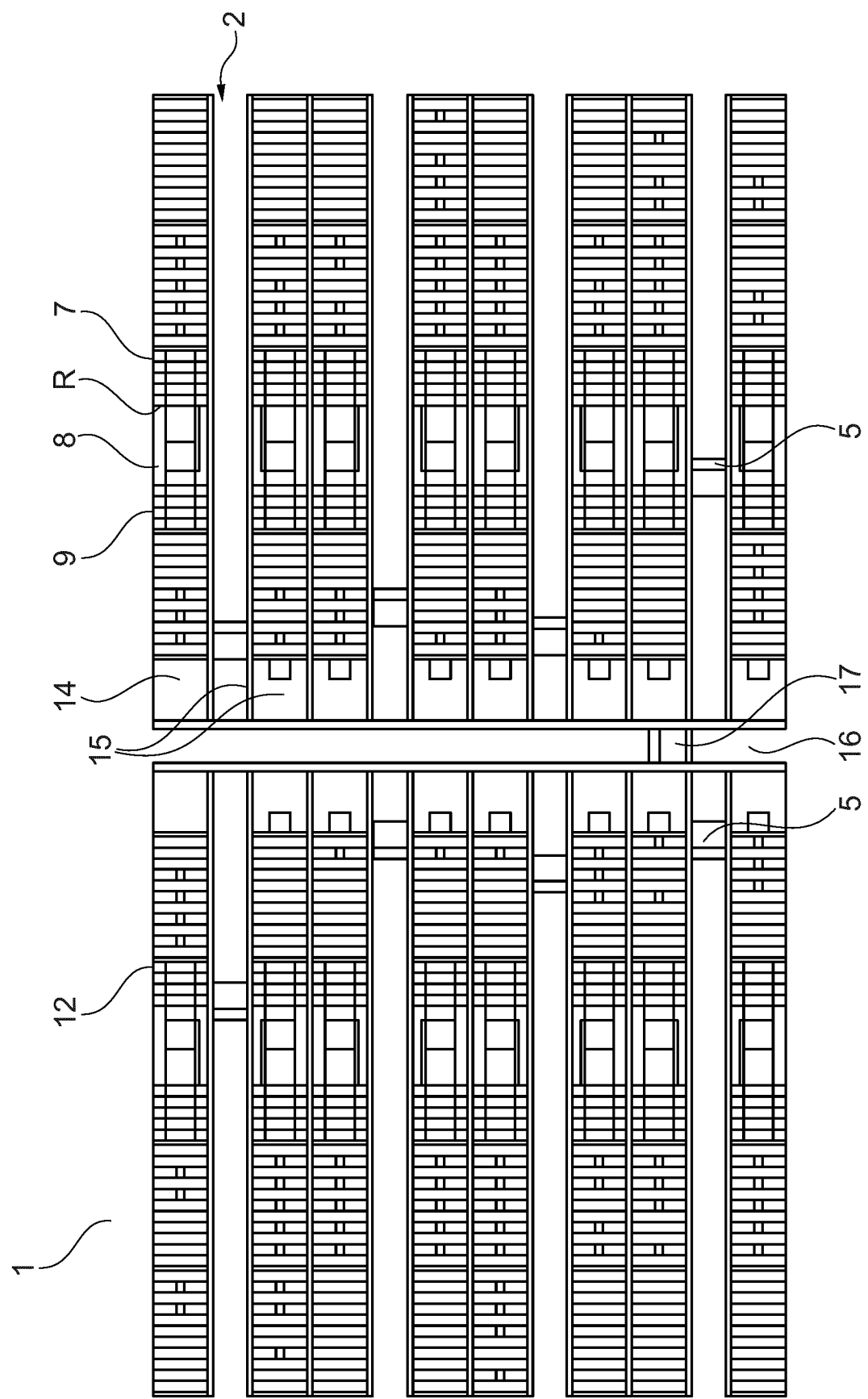
FIG. 6 shows a plan view of a variant of the third embodiment of a system of the disclosure.

Referring now to FIG. 6, disclosed is a system, which shares several features of the embodiment described above with reference to FIG. 1, so that only differences will be referred to.

In this embodiment two sets of independent primary racks R are utilized with a fast-track transfer shuttle 17 configured to run in a fast-track aisle 16 running transverse to the direction the primary racks extend, which is shared between the sets of primary racks R. Therefore in this form only one fast track exchange FT is needed, even though two storage rack sets are used, saving cost and space.

Figure 7:
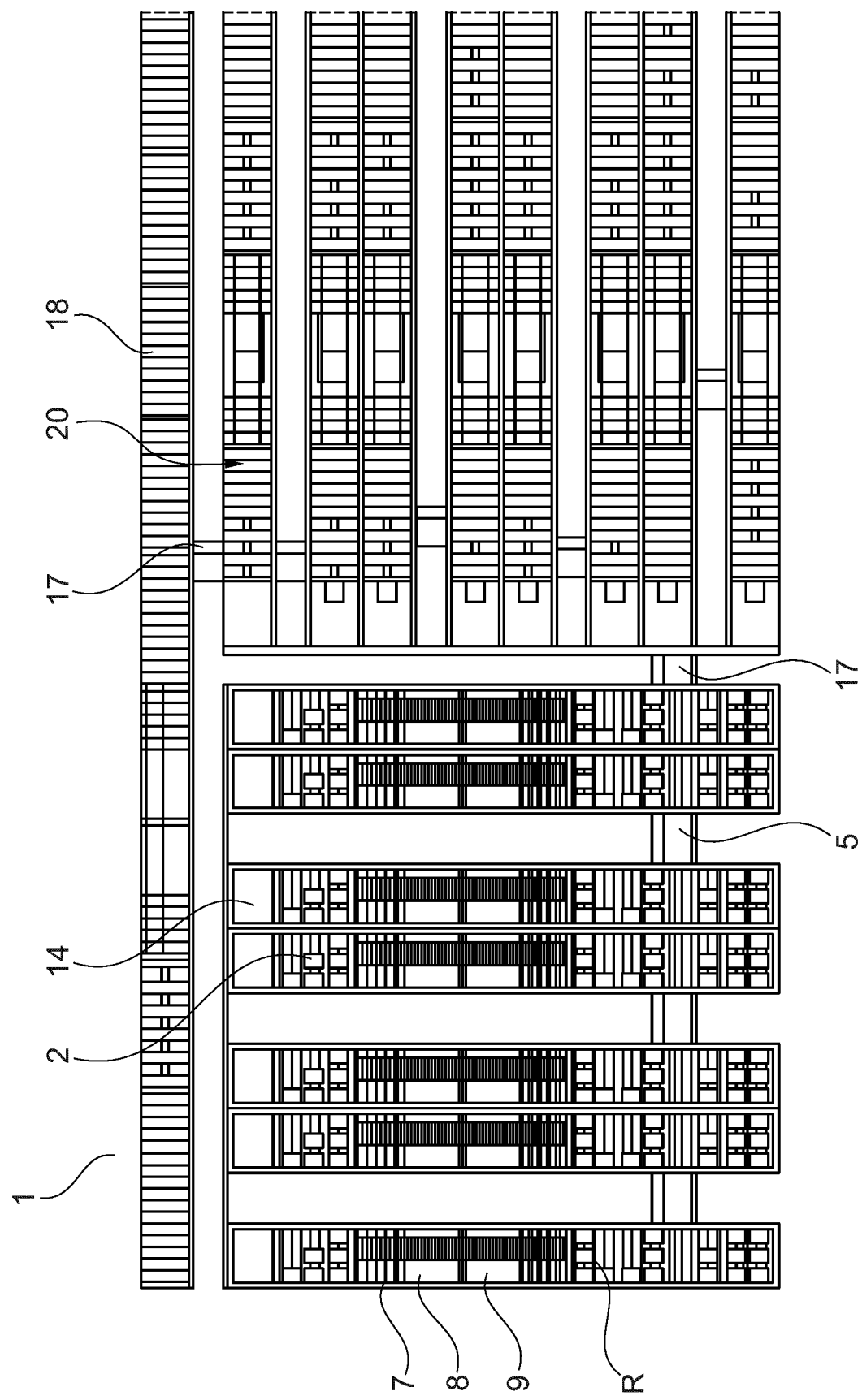
FIG. 7 shows a plan view of a fourth embodiment of a system of the disclosure.

Referring now to FIG. 7, the system can be further scaled to utilize a section of primary racks R having a section of aisle shuttles, a secondary fast-track rack 18 running transverse to the primary racks R and having a fast-track shuttle 17 extending there along and a section of tertiary racks 20 extending parallel to the fast-track rack 18. In other words, the racks may be nested or interlaced using the fast track and exchange ends 14 as combing elements, so as to save space and raise efficiency.

The fast-track shuttle 17 is generally configured and is of sufficient length to span multiple locations on a plurality of racks.

In the illustrated forms, exchange from the aisle shuttles to the fast-track shuttle and vice versa occurs through use of the exchange ends 14.

Figure 8:
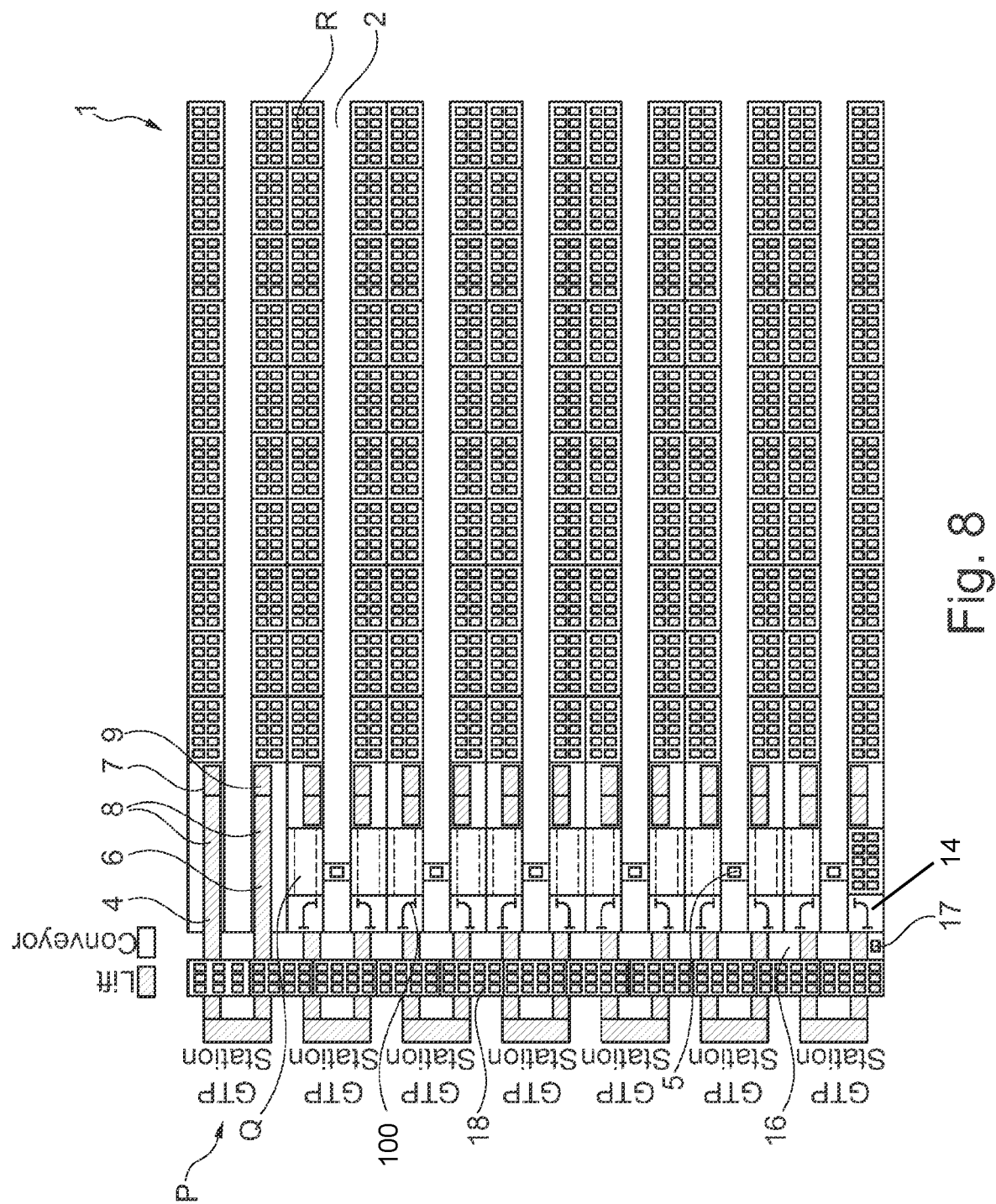
FIG. 8 shows a plan view of a fifth embodiment of a system of the disclosure.

In FIG. 8 an embodiment is shown, which is similar to that of FIG. 4.

As discussed before a lift 8 having two locations in each case is provided for each storage racking aisle 2. At the lower level, the lift 8 is adjoined by either a storage-entry feeding line 4 and a removal-from-storage feeding line 6 (shown on the top most aisle where the other features are left out for purposes of better understanding).

Alternatively, the lift may be provided with respective conveyors at an uppermost level or even between levels, or even at each level.

Arranged between the lift 8 and the storage rack R on each level are corresponding storage-entry and removal-from-storage buffer lines 7 and 9 in order to decouple the lift 8 from the aisle shuttles 5 travelling in the storage racking aisle 2.

It is understood that the storage-entry feeding lines 4 and removal-from-storage feeding lines 6 are connected to suitable picking stations P, forming a loop similar to that of FIG. 5.

Furthermore, the transverse conveyance locations Q are now positioned next to the exchange platforms 14 at the exchange ends 100.

The methods of conveying and storing items, totes or units within the system comprise transferring an item, tote or unit from a primary rack R onto an aisle shuttle 5. The aisle shuttle conveys the item, tote or unit in a first direction parallel to the primary rack R and delivers the item, tote or unit to an exchange platform 14 at an exchange end 100 of the primary rack. The delivery occurs in a second direction, transverse to the first direction. The item, tote or unit is then picked up by the fast-track shuttle 17 in the first direction. The fast-track shuttle 17 then conveys the item in the second direction transverse to the primary rack moving along track 16. The item, tote or unit can then be delivered to a further exchange platform 14 of an exchange end 100, to a secondary rack in cases where a secondary rack extends in line with the fast-track shuttle or to lifts.

In relation to FIGS. 9-12, four principles of operation will be described hereinafter by reference to the above storage facility.

Figure 9:
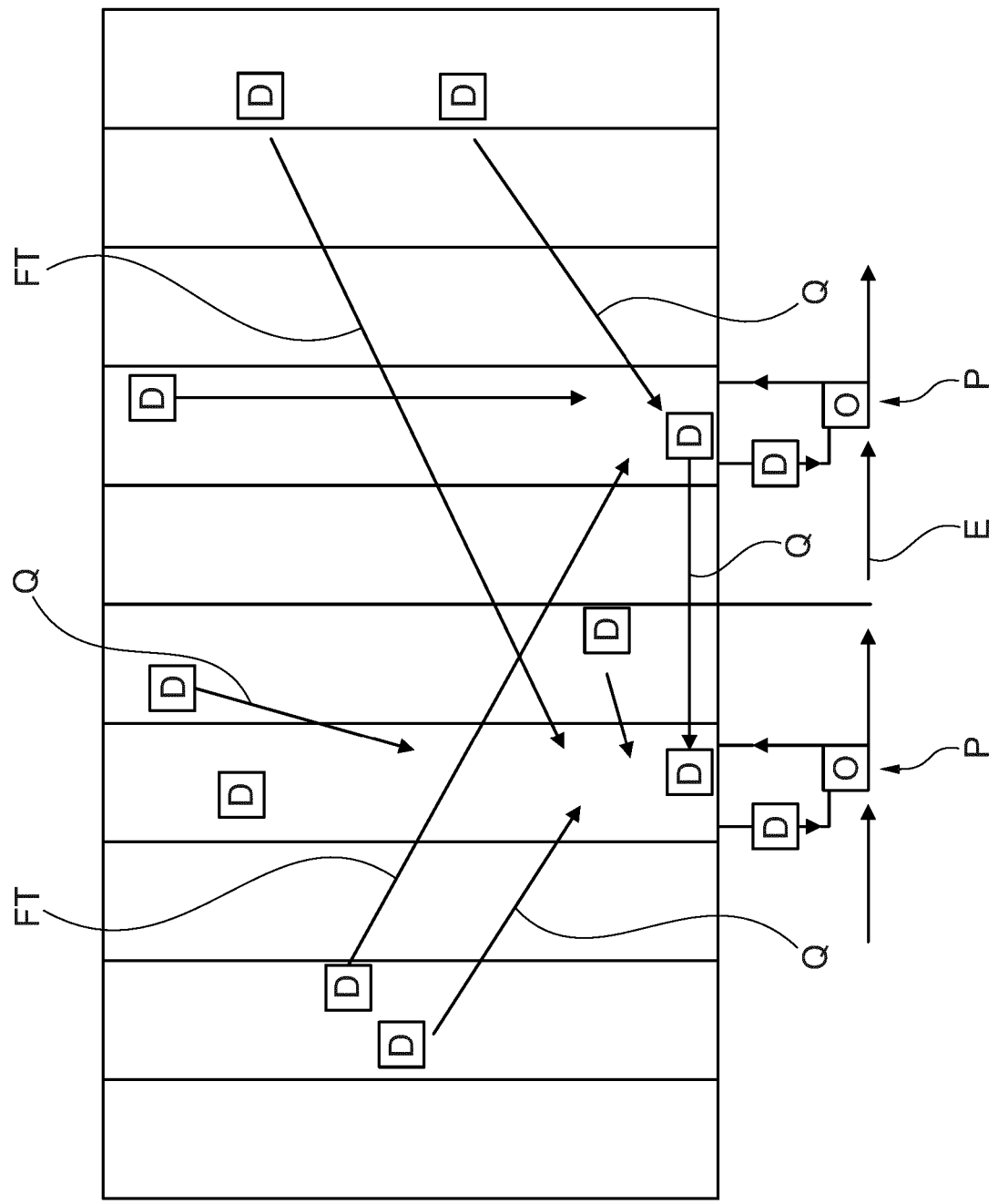
FIG. 9 shows a simplified and schematic view of the inventive storage facility which is operated in accordance with a first principle.

In FIG. 9, the so-called "airport departure" strategy is described. In accordance with this operating principle, only relevant source units D or full source units are transferred to a selected aisle. If the aisle is close to the source aisle this takes place by means of the transverse conveyance locations Q. If however the source and destination aisle are further away from each other then the fast track exchange FT described above is used. Therefor the aisle and the route of transportation are selected based upon minimisation of the movement in the transverse conveyance locations Q between aisles and order utilisation and distribution.

In other words, for the purpose of picking/consolidation, the aisle selected is the one which permits minimisation of the movement of the product units D for order processing and the order can be completed at one individual aisle or a single picking station P at which the order units O are filled with all of the articles of an order from the corresponding product units D. The order units O can be transferred either from the picking station P back into the storage facility for temporary storage therein and consolidation, or can be transferred to a dispatch station for completion of the order by an external conveyor E which connects the picking stations. When consolidating full source units, full source units associated with the same order are stored in an aisle until the order awaits processing. Then, the source units are removed from storage consecutively from the aisle, wherein the specified sequence can be maintained for the most part.

Figure 10:
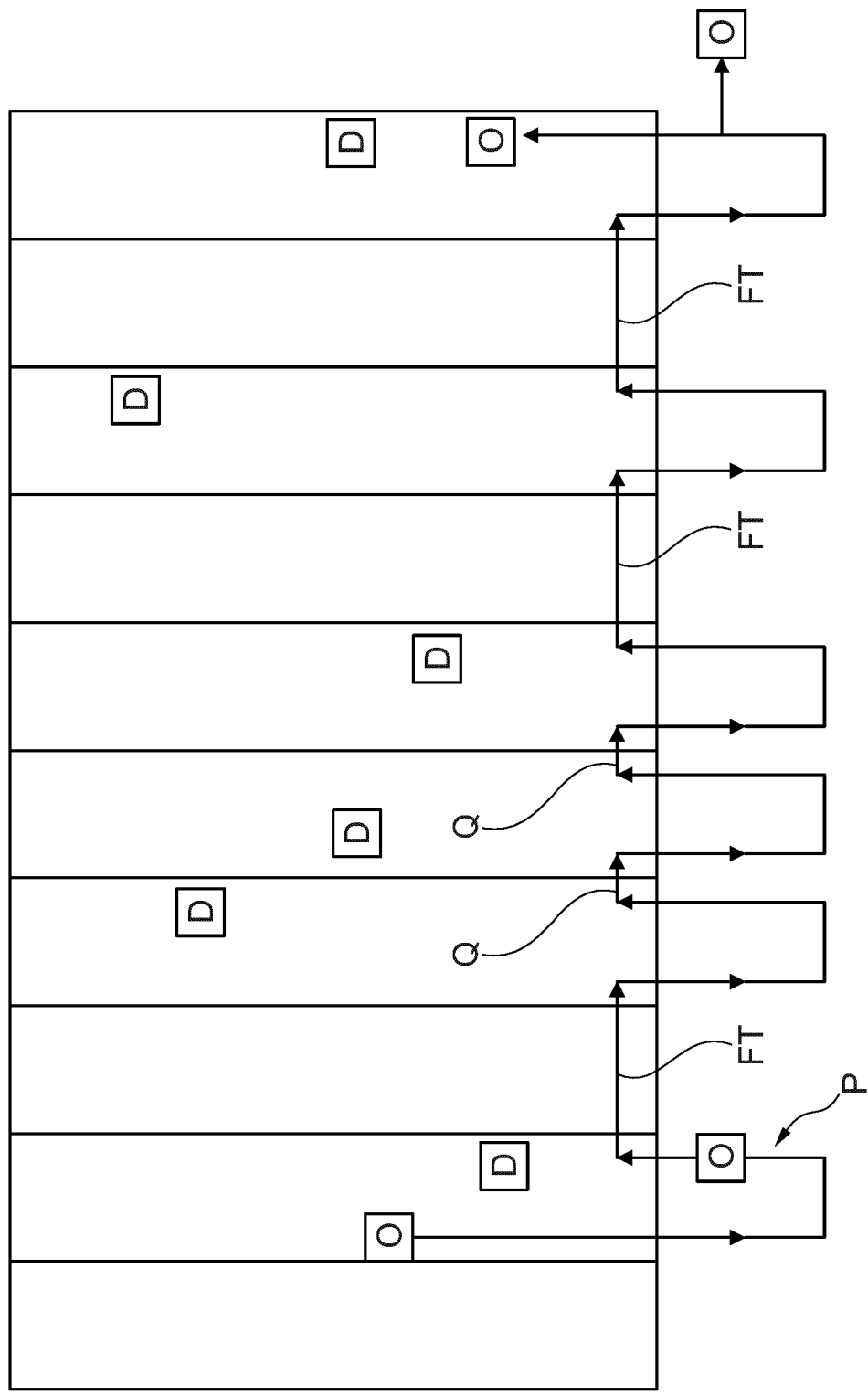
FIG. 10 shows a simplified and schematic view of the inventive storage facility which is operated in accordance with a second principle.

In FIG. 10, the so-called "limousines" strategy is described. In accordance with this mode of operation, only in-order units O are moved through the automated storage facility by means of the transverse conveyance locations Q or the fast track exchange FT. In other words, picking is performed at each relevant aisle, in which a relevant product unit or source unit is stored and the order units O "travel" through the aisles to a plurality of picking stations P until the order is processed. Depending on the distance of travel necessary either transverse conveyance locations Q or the fast track exchange FT is used.

Figure 11:
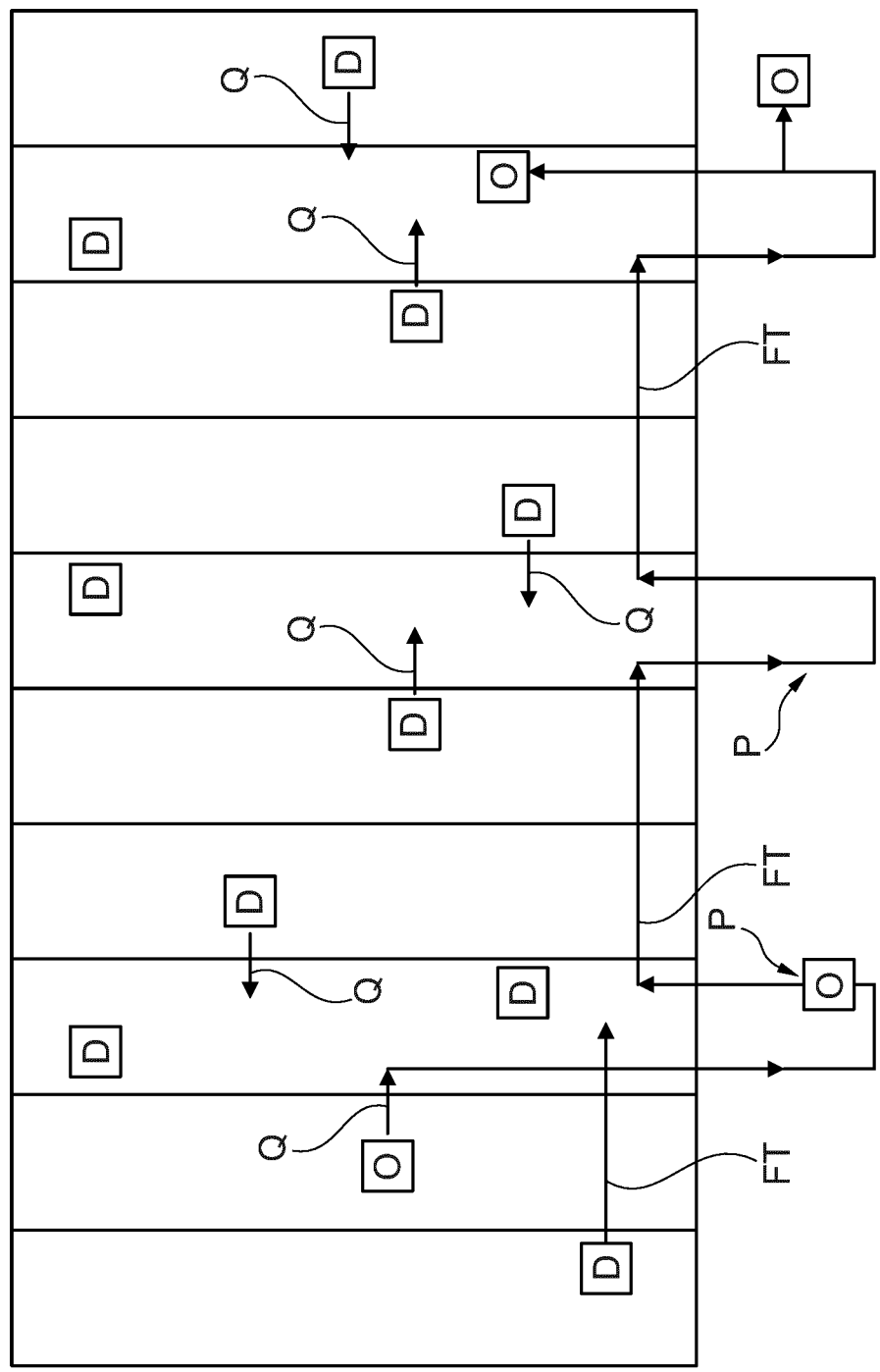
FIG. 11 shows a simplified and schematic view of the inventive storage facility which is operated in accordance with a third principle.

In FIG. 11, the so-called "bus stops" strategy is described. In accordance with this operating strategy, order units O as well as product units D are transferred in the automated storage facility by means of the transverse conveyance locations Q or the fast track exchange FT, depending on the distance of travel necessary. In other words, picking is performed at a small number of selected aisles 2, at which relevant product units D for an order are consolidated by means of the transverse conveyance locations Q—if the distance is small—or using the fast track exchange FT—if the distance is greater—and the order units O "travel" in the same manner via a plurality of aisles 2 to selected picking stations P until the order is fulfilled. Consolida-tion of the order units O and product units D is based upon optimisation of the order utilisation and distribution and optimum use of such mobile resources, such as e.g. racking serving units, lifts etc.

In FIG. 12, the so-called "airport arrival" strategy is described. In accordance with this operating principle, source units or full source units D which are incoming (to be placed into storage) are placed into storage in the automated storage facility directly into the particular aisle or nearest possible aisle which will be used or most likely be used for order processing, based upon the information available at the time of storage-entry, taking into account a minimisation of the transverse displacement in the transverse conveyance locations Q—if the distance is small—or using the fast track exchange FT—if the distance is greater. This information includes but is not limited to:

instantaneous product distribution or deviations of each product in the storage facility;
orders which are already associated with individual aisles;
orders awaiting processing;
summary of families or product categories Source units D1 which are to be placed into storage, associated with a first order, and source units D2 which are to be placed into storage, associated with a second order, are conveyed on an input conveyor I into the storage facility or the corresponding aisles, which is connected to the storage-entry feeding lines, based upon the above rules.

If an input conveyor I is not provided, the supply/inward transfer can also be conducted in a different way in accordance with the specification of the inventory management software, e.g. manually, by automated guided vehicles, depalletizers etc. For example the fast track lanes 16 and transfer shuttle 17 may be used.

Within the storage facility, the source units D are transferred by means of the transverse conveyance locations Q—if the distance is small—or using the fast track exchange FT—if the distance is greater—to the actual aisle where picking then actually takes place, wherein e.g. a source unit D1, after being used in one order, can subsequently become a source unit D2 to be used in a different order.

As described herein with reference to the figures, transverse conveyance will be used for short distances, e.g. exchange of items between neighboring aisles or the next two aisles. If the aisles are farther away than five aisles away then the fast track transfer will usually be used. The in-between distance (2-5 aisles) is a grey area and depends on other factors, such as position of an item with in the longitudinal direction of the rack, availability of the aisle shuttle and transfer shuttle as well as traffic at the transverse conveyance locations and the exchange positions etc.

The method allows for alternative paths of inter aisle transfer that allow an item, tote or unit to cross an aisle in a plurality of routes. The number of routes is $2^{(n-1)}$ where n is the number of racks. This is because any item, tote or unit can be transferred between aisles using the fast track shuttle or using a combination of aisle shuttles and direct transfer between adjacent aisles. This has the benefit of allowing for scenarios where avoidance of a high congestion or highly utilized aisle may assist or in avoidance of aisles under maintenance.

In the claims which follow and in the preceding summary of the disclosure, except where the context requires otherwise due to express language or necessary implication, the word "comprising" is used in the sense of "including", that is the features specified may be associated with further features in various embodiments of the system and method.

Variations and modifications can be made to the parts previously described without departing from the spirit or ambit of the claims.

The invention claimed is:

1. An automated warehouse storage system for storage and retrieval of items and conveying items within the storage system, the system comprising:
a plurality of primary multilevel storage racks, the primary multilevel storage racks positioned parallel with one another, and extending in a first direction, wherein each of the plurality of primary multilevel storage racks has at least one storage rack exchange level in which items are delivered to or retrieved from the storage racks, and has at least one exchange position in the at least one storage rack exchange level; and
wherein at least one transfer shuttle is configured to travel in a second direction spanning the at least one exchange position of each of the storage racks and transverse to the first direction, the at least one transfer shuttle and the at least one exchange position of each storage rack configured for exchanging items between the at least one transfer shuttle and the at least one exchange position of each of the storage racks to retrieve or deliver items;

wherein the primary multilevel storage racks are located in facing pairs with an aisle in between each storage rack of the pair, and wherein the primary multilevel storage racks of neighboring aisles adjoin one another;

wherein an automated storage and removal apparatus is provided for each aisle for storage and retrieval of items, which exchanges items directly between adjacent storage racks in a certain level by actively displacing items between a storage rack of a first aisle and a storage rack of an adjacent aisle using passive transverse conveyance locations, and wherein the automated storage and removal apparatus is an aisle shuttle located in the aisle; and wherein at least one of the at least one exchange positions is formed by an exchange platform being accessible by the at least one transfer shuttle and also being accessible by the automated storage and removal apparatus of each adjacent aisle, and wherein the aisle shuttles comprise racking serving units or single-level racking serving units, and wherein the exchange platform is formed as a stationary flat surface.

2. The system as defined in claim 1, wherein the at least one exchange position is located at one end of the storage racks.

3. The system as defined in claim 2, wherein at least one aisle has more than one exchange position.

4. The system as defined in claim 3, wherein at least one exchange position of the at least one aisle having more than one exchange position is in-line with each rack of an aisle.

5. The system as defined in claim 1, wherein the exchange platform allows single deep or multiple deep placement of items in both the first direction and the second direction.

6. The system as defined in claim 1, wherein the at least one exchange position is located at either one end or middle of the storage racks.

7. The system as defined in claim 6, wherein the at least one transfer shuttle is adapted to carry an item orientated transversely compared to the orientation of the item on the aisle shuttles.

8. The system as defined in claim 7, further comprising a secondary rack oriented to extend in the second direction.

9. The system as defined in claim 1, further comprising a second plurality of primary multilevel storage racks each having at least one exchange position, wherein the at least one exchange positions of the first plurality of primary multilevel storage racks and the second plurality of primary multilevel storage racks face each other.

10. The system as defined in claim 9, further comprising an item lift in each rack for exchange of items between storage rack levels and the at least one storage rack exchange level.

11. The system as defined in claim 1, wherein the at least one transfer shuttle is configured to travel on tracks.

12. The system as defined in claim 1, wherein the at least one transfer shuttle and/or each of the aisle shuttles is a track guided transport vehicle or mobile platform or a wire guided transport vehicle or mobile platform.

13. The system as defined in claim 1, wherein the at least one transfer shuttle is adapted to carry an item orientated transversely compared to the orientation of the item on the aisle shuttles.

14. The system as defined in claim 1, further comprising a secondary rack oriented to extend in the second direction.

15. The system as defined in claim 1, further comprising an item lift in each rack for exchange of items between storage rack levels and the storage rack exchange level.

16. A method of storing, retrieving and conveying items within a storage facility, the method comprising:

providing a plurality of primary storage racks positioned parallel with one another and extending in a first direction, wherein the primary storage racks are serviced by a plurality of storage and retrieval devices comprising aisle shuttles configured to run in the first direction;

providing a plurality of aligned exchange positions located at one end of each of the primary storage racks in an exchange level, wherein the exchange positions are formed as stationary flat surfaces, and wherein items are transferable between the storage and retrieval devices and the exchange positions;

providing a transfer shuttle in the exchange level and configured to run substantially in a second direction transverse to the first direction in the exchange level, its travel spanning the plurality of aligned exchange positions;

exchanging items between the transfer shuttle and the exchange positions to transport one or more items between the primary storage racks; and using a lift to transport items to and from the exchange level, the method further comprising:

transferring a selected item from one of the primary storage racks onto a selected one of the aisle shuttles;

conveying the selected item in the first direction to a position proximal to one of the exchange positions comprising an associated exchange position using the selected aisle shuttle;

transferring the selected item onto the associated exchange position in the second direction;

transferring the selected item from the associated exchange position in the first direction and onto the transfer shuttle; and conveying the selected item in the second direction using the transfer shuttle.

17. A method as defined in claim 16, the method further comprising:

conveying the selected item in the second direction to a position proximal another one of the exchange positions comprising another selected exchange position using the transfer shuttle;

transferring the selected item onto the another selected exchange position in the first direction;

transferring the selected item from the another selected exchange position in the second direction and onto another one of the aisle shuttles;

conveying the selected item in the first direction using the another aisle shuttle; and transferring the selected item to another one of the primary storage racks from the another aisle shuttle.

* * * * *